(12) United States Patent
Morris et al.

(10) Patent No.: US 10,399,015 B2
(45) Date of Patent: Sep. 3, 2019

(54) FILTER CAP WITH INSERT

(71) Applicants: Caterpillar Inc., Peoria, IL (US);
Advanced Filtration Systems, Inc.,
Champaign, IL (US)

(72) Inventors: Bryant Alan Morris, Peoria, IL (US);
Patrick Allen Chinn, Downs, IL (US)

(73) Assignees: Caterpillar Inc., Deer Field, IL (US);
Advanced Filtration Systems, Inc.,
Champaign, IL (US)

( * ) Notice: Subject to any disclaimer, the term of this patent is extended or adjusted under 35 U.S.C. 154(b) by 214 days.

(21) Appl. No.: 15/299,498

(22) Filed: Oct. 21, 2016

(65) Prior Publication Data

US 2018/0111067 A1 Apr. 26, 2018

(51) Int. Cl.
*B01D 29/96* (2006.01)
*B01D 35/30* (2006.01)
*F16B 37/14* (2006.01)

(52) U.S. Cl.
CPC .......... *B01D 29/96* (2013.01); *B01D 35/306* (2013.01); *B01D 2201/301* (2013.01); *B01D 2201/305* (2013.01); *F16B 37/14* (2013.01)

(58) Field of Classification Search
CPC .... B01D 29/96; B01D 35/30; B01D 2201/31; B01D 2201/305; F16B 37/14
See application file for complete search history.

(56) References Cited

U.S. PATENT DOCUMENTS

| | | | |
|---|---|---|---|
| 5,207,131 A | 5/1993 | Pool et al. | |
| 5,855,772 A | 1/1999 | Miller et al. | |
| 6,517,063 B2 | 2/2003 | Beyer | |
| 6,607,665 B2 | 8/2003 | Fick et al. | |
| 8,826,780 B1 * | 9/2014 | Alho | B25B 13/06 81/124.2 |
| 2007/0215561 A1 | 9/2007 | Yates et al. | |
| 2014/0021119 A1 | 1/2014 | Malgorn et al. | |
| 2016/0151895 A1 * | 6/2016 | Markiewicz | B25B 27/0042 81/474 |
| 2016/0230623 A1 * | 8/2016 | Lapoint | F01M 11/03 |
| 2017/0363136 A1 * | 12/2017 | Liu | F16B 37/14 |
| 2018/0065066 A1 * | 3/2018 | Morris | B01D 29/114 |

* cited by examiner

*Primary Examiner* — David C Mellon
*Assistant Examiner* — Liam Royce
(74) *Attorney, Agent, or Firm* — Law Office of Kurt J. Fugman LLC

(57) ABSTRACT

An insert for use with a filter cap is provided. The insert comprises a cover portion including a top surface, a bottom surface, and a hexagonal perimeter defining a center, and an attachment portion extending from the bottom surface of the cover portion including a cylindrical annular wall centered on the cover portion.

1 Claim, 5 Drawing Sheets

FILTER CAP WITH INSERT

TECHNICAL FIELD

The present disclosure relates to top loaded filter systems. More specifically, the present disclosure relates to top loaded filter systems that use a filter cap that may also have an insert attached to the filter cap.

BACKGROUND

Filter systems and filter elements that are used to filter a fluid such as fuel are well-known in all fields that use combustion engines including earthmoving, construction and mining equipment. A filter system is often provided that separates water or contaminants from the fuel before it enters the engine. A filter element is often provided as part of this system that includes a filter media wrapped around a center tube. The configuration of the tube and the filter media is often substantially circular or cylindrical.

A cover or filter cap is often disposed above the filter element, covering it and sealing the filter system, preventing the ingress and egress of fluids and contaminants such as dirt, debris, rain water, etc. Such filter caps may be needed to be configured with a way to attach and detach the filter cap at regular intervals to allow the servicing of the filter system such as when the filter element needs to be replaced. As can be imagined, repeated use of this filter cap as it is screwed and unscrewed from the filter system require a robust design that will not require replacement of the filter cap because of wear, etc. Also, the filter cap must mate with various components of the filter system such as the filter element in a manner that ensures the proper functioning of these various components and the filter system as a whole.

Also, it is often desirable to communicate with the end user concerning various attributes of the filter system. This is usually done using labels or the like that may fall off or deteriorate, leading to a loss of the desired communication with the end user.

SUMMARY OF THE DISCLOSURE

A filter cap is provided comprising a body including a generally hollow cylindrical configuration, defining a radial direction and a longitudinal axis, the body further including a cylindrical sidewall, an open end disposed along the axis, and an enclosed end disposed along the axis, a domed wall that encloses the filter cap at the enclosed end and that includes a hexagonal structure extending outwardly from the domed wall, wherein the hexagonal structure defines a hexagonal outer perimeter, an inner perimeter, and at least a first void disposed between the outer perimeter and the inner perimeter; and at least a first rib extending inwardly from the domed wall, the rib being disposed radially between the hexagonal structure and the cylindrical sidewall.

An insert for use with a filter cap is provided. The insert comprises a cover portion including a top surface, a bottom surface, and a hexagonal perimeter defining a center, and an attachment portion extending from the bottom surface of the cover portion including a cylindrical annular wall centered on the cover portion.

A filter cap assembly is provided. The assembly comprises a filter cap including a body including a generally hollow cylindrical configuration, defining a radial direction and longitudinal axis, the body further including a cylindrical sidewall, an open end disposed along the axis, and an enclosed end disposed along the axis, a domed wall that encloses the filter cap at the enclosed end and includes a hexagonal structure extending outwardly from the domed wall, wherein the hexagonal structure defines a hexagonal outer perimeter, an inner perimeter, and at least a first void disposed between the outer perimeter and the inner perimeter, and at least a rib extending inwardly from the domed wall, the rib being disposed radially between the hexagonal structure and the cylindrical sidewall. The assembly also comprises an insert including a cover portion including a top surface, a bottom surface, and a hexagonal perimeter, and a first projection that extends from the bottom surface of the cover portion and that is configured to be press fit into the void.

DETAILED DESCRIPTION

Figure 1:
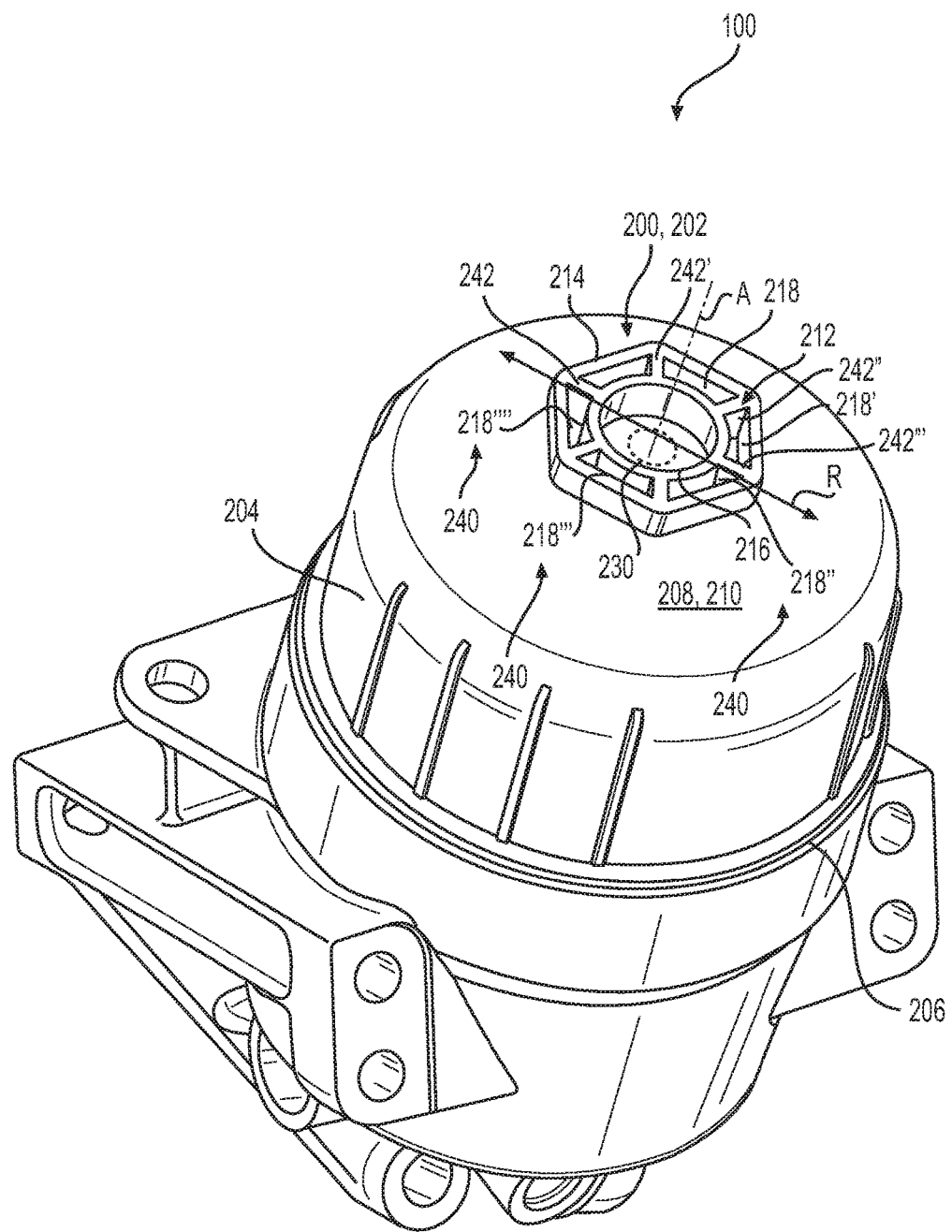
FIG. 1 is a perspective view of a top load filter system with a filter cap according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

This disclosure describes various embodiments of a filter cap that may withstand repeated attachment and removal from a filter system using a wrench or the like. In some embodiments, an insert may be provided that attaches to the filter cap, communicating certain attributes of the filter system or filter cap to the end user. In particular embodiments, the insert may be attached to hexagonal structure disposed at the top of the filter cap, covering voids that may collect dirt, debris and the like.

Figure 2:
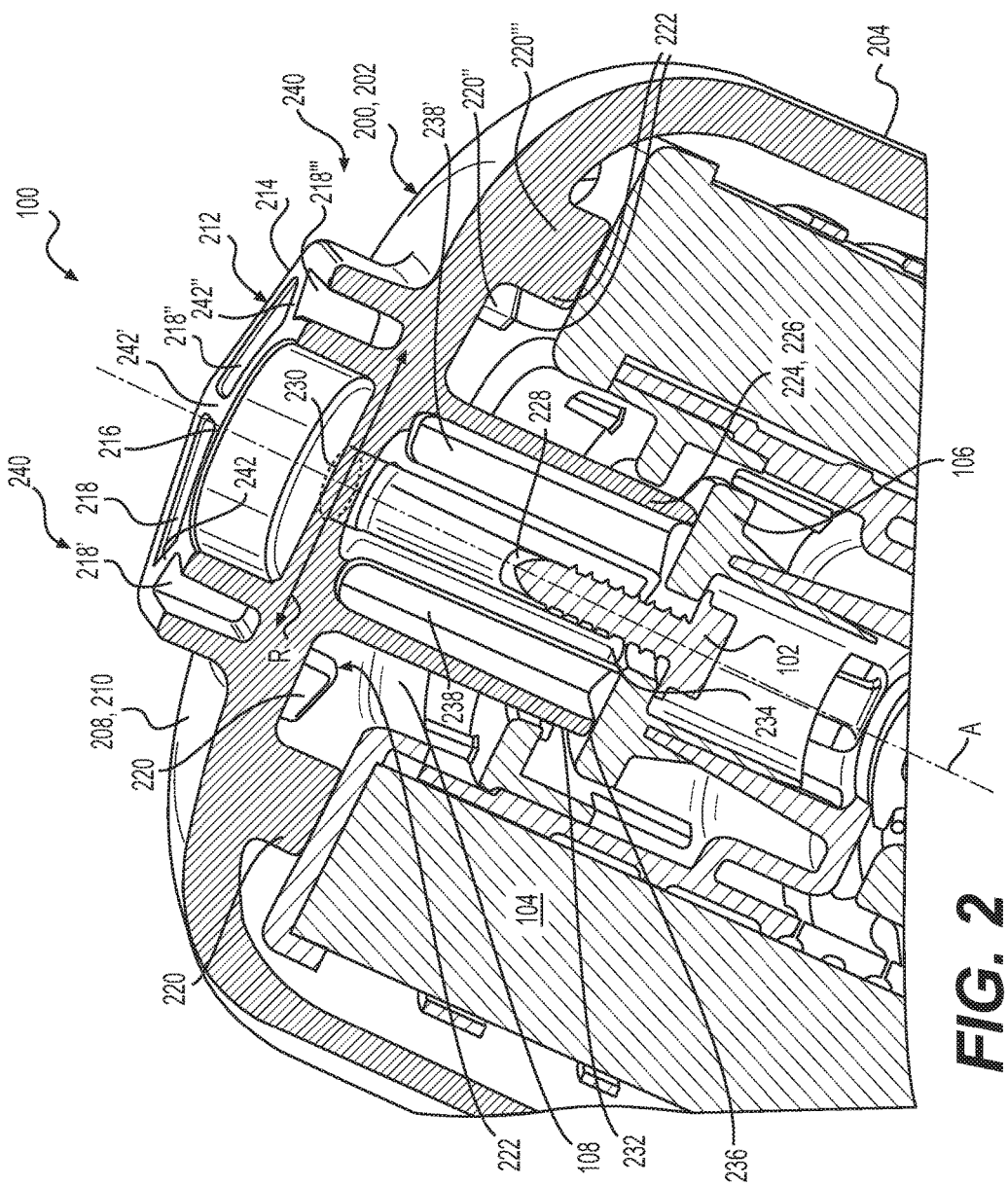
FIG. 2 is an enlarged cross-sectional view of the filter system of FIG. 2 taken along lines 2-2 thereof.

Looking at FIGS. 1 and 2, an embodiment of a filter cap 200 for use with a filter system 100 according to an embodiment of the present disclosure is illustrated. The filter cap 200 comprises a body 202 including a generally hollow cylindrical configuration, defining a radial R direction and a longitudinal axis A. The body 202 further includes a cylindrical sidewall 204, an open end 206 disposed along the axis A, and an enclosed end 208 disposed along the axis A. There is a domed wall 210 that encloses the filter cap 200 at the enclosed end 208. A hexagonal structure 212 extends outwardly from the domed wall 210, wherein the hexagonal structure 212 defines a hexagonal outer perimeter 214, an inner perimeter 216, and at least a first void 218 disposed between the outer perimeter 214 and the inner perimeter 216. At least a first rib 220 extends inwardly from the domed wall 210, the rib being disposed radially between the hexagonal structure 212 and the cylindrical sidewall 204.

As used herein, the term "inwardly" means toward the interior of the filter cap while the term "outwardly" means toward the exterior of the filter cap. Similarly, the terms "radially inner" or "radially outer" means nearer or further away from a cylindrical axis, respectively.

For this embodiment, the inner perimeter 216 of the hexagonal structure 212 is circular and is radially centered on the axis A. Other configurations for the inner perimeter 216 are considered to be within the scope of the present disclosure. Also as best seen in FIG. 2, there is a plurality of ribs 220 extending inwardly from the dome wall 212, defining a circular array 222 about the axis A. Inwardly extending attachment structure 224 is provided that is centered about the axis A. This inwardly extending attachment structure 224 includes an annular circular wall 226 that is centered about the axis A. The annular circular wall 226 defines a central attachment aperture 228. This aperture 228 may be configured to mate with a self-threading screw 102 such as those intended for use with plastic components.

As shown in FIGS. 1 and 2, a thick section of material may be present between the outside surface of the domed wall 210 and the bottom of the attachment aperture 228. However, the material may be cored out to prevent the formations of sinks or voids during a plastic injection molding process. According, the annular circular wall 226 may define a core out aperture 230 that is in communication with or that terminates slightly above the central attachment aperture 228 along the axis A. This core out aperture 230 is represented in FIGS. 1 and 2 by dotted lines. The annular circular wall 226 defines a radially outer surface 232, a radially inner surface 234, and a free end surface 236 that extends from the radially outer surface 232 to the radially inner surface 234. The free end surface 236 defines at least one void 238. As shown in FIG. 2, there are two such voids 238.

The filter system 100 depicted by FIG. 2 includes a filter element 104 and a center tube 106 having constructions known in the art. Before being attached to the filter system 100, the center tube 106 is attached to the filter cap 200 using the self-threading screw 102, creating a first subassembly. Then, the center tube 106 is inserted into the top of the central opening 108 of the filter element 104 and twisted using the filter cap 200 as a handle in a manner known in the art until the center tube 106 is completely inserted into filter element 104 and the ribs 220 contact the top of the filter element 104. Hence, the filter element 104, center tube 106 and the filter cap 200 form a second subassembly that is then screwed onto the filter system 100 via threads (not shown) disposed along the inside bottom edge of the cylindrical sidewall 204, adjacent the open end 206. Although not shown, projections from the center tube 106 may fit within the voids 238 of the inwardly extending attachment structure 224, helping to prevent rotation of the center tube 106 with respect to the filter cap 200 at the various stages of assembly.

For this embodiment, the inner perimeter 216 of the hexagonal structure 212 is circular and is radially centered on the axis A and the radially outer surface 232 of the annular circular wall 226 is approximately radially coextensive with the circular inner perimeter 216. That is to say, the overlap between the inwardly extending attachment structure 224 and the outer hexagonal structure 212 is minimized to maintain a consistent nominal wall thickness, helping to reduce the formation of sinks or voids and the like during the plastic injection molding process.

Still referring to FIGS. 1 and 2, there are a plurality of voids 218 disposed between the outer perimeter 214 and the inner perimeter 216 of the hexagonal structure 212, defining a circular array 240 about the axis A. These voids 218 are bounded by the outer hexagonal perimeter 214 and inner perimeter 216, as well as connecting ribs 242 that span from the outer perimeter 214 to the inner perimeter 216. These voids 218 also help to maintain the nominal wall thickness of the filter cap 200 for reasons already explained earlier herein. As can be imagined, dirt and debris may fill these voids and the interior of the inner circular perimeter 216.

Figure 3:
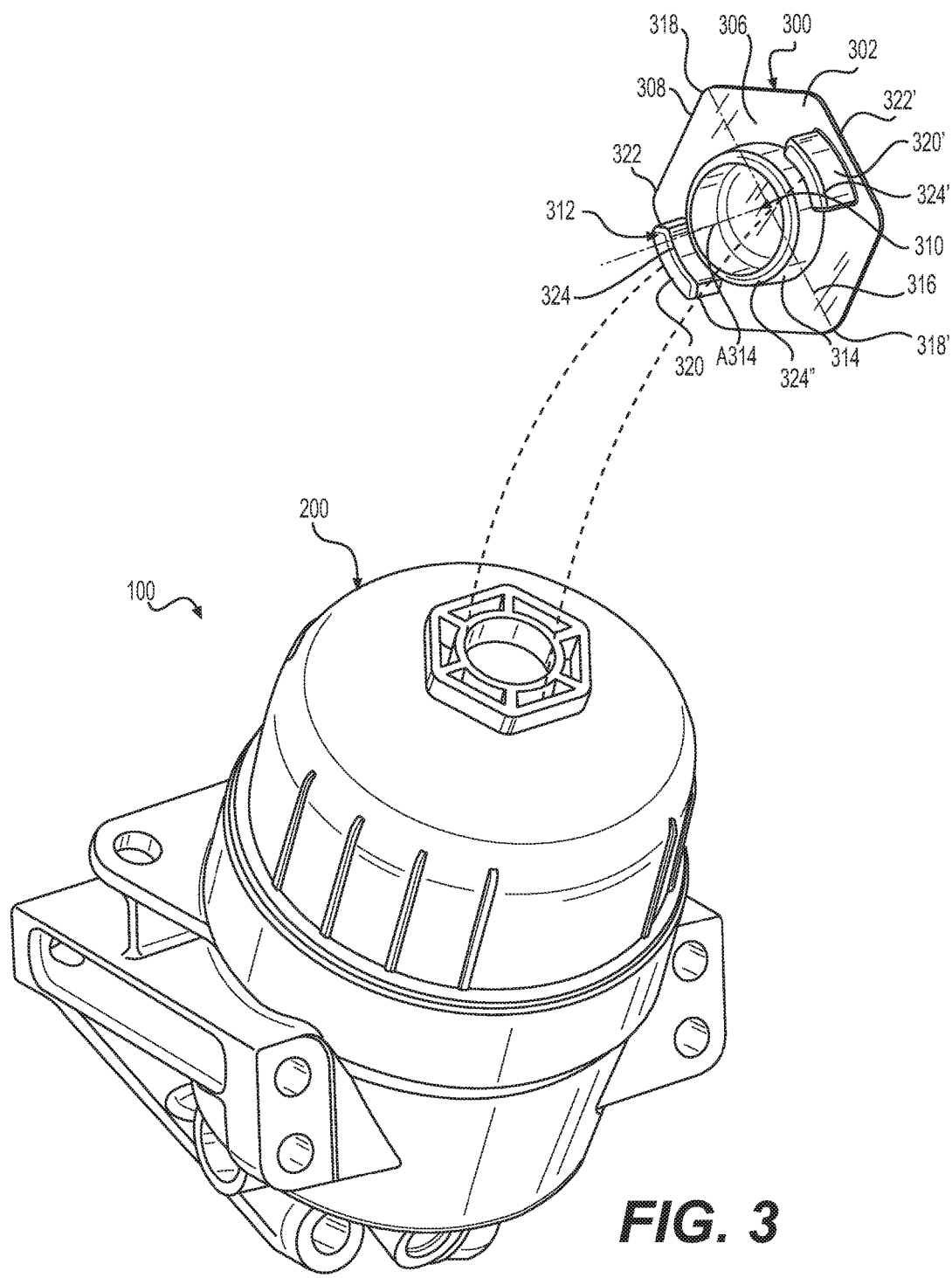
FIG. 3 is perspective assembly view of an insert being attached to the filter cap of the filter system of FIG. 1.
Figure 4:
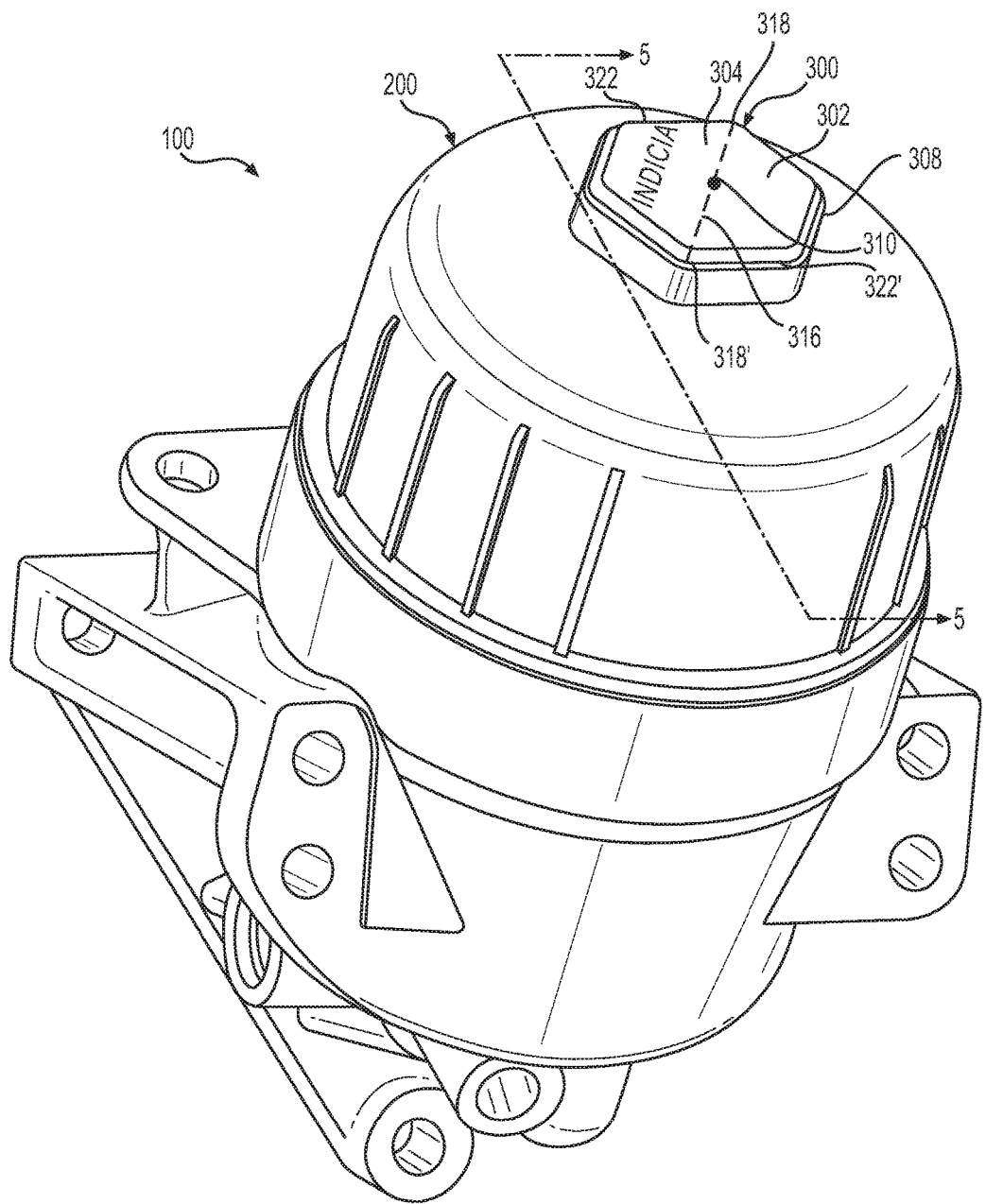
FIG. 4 is a perspective view of the filter system of FIG. 3 with the insert attached to the filter cap.
Figure 5:
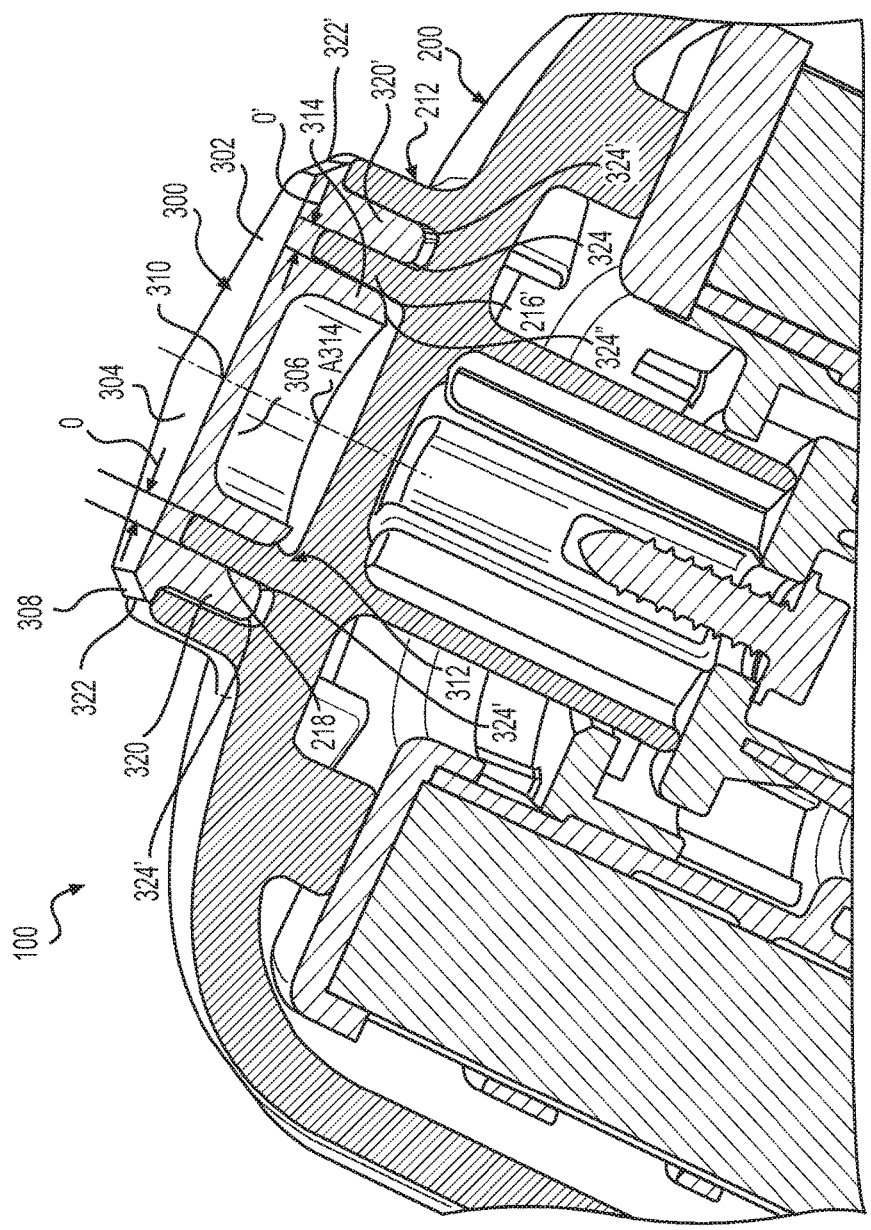
FIG. 5 is an enlarged cross-sectional view of the filter system of FIG. 4 taken along lines 5-5 thereof.

As a result, an insert 300 for use with the filter cap 200 may be provided. As shown in FIGS. 3-5, the insert 300 comprises a cover portion 302 including a top surface 304, a bottom surface 306, and a hexagonal perimeter 308 defining a center 310. The insert 300 further comprises an attachment portion 312 extending from the bottom surface 306 of the cover portion 302. The attachment portion 312 includes a cylindrical annular wall 314 centered on the cover portion 302. That is to say, the midpoint of a line 316 from one vertex 318 of the hexagonal perimeter 308 to the opposite vertex 318' defines the center 310 of the cover portion 302 and the cylindrical axis A314 of the annular wall 314 is coincident with this center 310. A similar definition of "center" or "centering" may be applied when used elsewhere in the present disclosure.

The insert 300 further comprises a first projection 320 that extends from the bottom surface 306 of the cover portion 302, wherein the projection 320 is spaced away from the cylindrical annular wall 314. A second projection 320', which may be similarly configured as the first projection 320, is positioned diametrically opposite of the first projection 320. The hexagonal perimeter 308 includes a first and a second flat side 322, 322' that are diametrically opposite each other and the first and second projections 320, 320' are positioned adjacent the first and second flat sides 322, 322' respectively.

For this embodiment, the first and second projection 320, 320' are identically configured, having a partially cylindrical annular configuration. The first and second projections 320, 320' are also offset the same distance 0 (see FIG. 5) from the cylindrical annular wall 314. The end result of all these geometrical parameters is that these projections 320, 320' are at least complimentarily configured to fit within the voids 218 of the hexagonal structure 212 of the filter cap 200 as shown best in FIG. 5.

To help facilitate the insertion or assembling of the insert 300 onto the filter cap 200, in many embodiments either the cylindrical annular wall 314 or the first projection 320 includes a lead-in feature 324. In the embodiment shown in FIG. 5, both the annular wall 314 and the first and second projections 320, 320' include lead-in features 324. More specifically, radially inner and radially outer radii 324, 324' are provided on the free end of the first and second projection 320, 320' while only a radially outer radius 324" is provided on the cylindrical annular wall 314. As the insert 300 approaches the filter cap 200 as depicted by FIG. 3, the lead-in features 324 make it easier for the projections 320 to find and be guided into the voids 318 of the hexagonal structure 212 of the filter cap 200 (see FIG. 5).

At the same time, the cylindrical annular wall 314 of the insert 300 will slide past the circular annular wall that forms the inner perimeter 216 of the hexagonal structure 212. A slight press fit may be provided between the projections and the voids and/or the contact faces of the inner perimeter of the hexagonal structure and the cylindrical annular wall. Or, the projections and cylindrical annular wall may pinch on the inner wall of the inner perimeter of the hexagonal structure. As the user presses down firmly on the insert, enough friction is generated to keep the insert in place over time on the filter system. The insert is then able to keep the voids of the filter cap free of dirt and debris.

In some embodiments, the top surface 304 of the cover portion 302 may include INDICIA (shown in FIG. 4) that may communicate various attributes of the filter system 100 to the end user. For example, the direction for attaching and detaching the filter cap 200 may be symbolized on the top surface 304 of the insert 300. Similarly, the brand or manufacturer of the filter system 100 may be embossed onto the top surface 304 of the insert 300, etc.

INDUSTRIAL APPLICABILITY

In practice, a machine may be sold or retrofitted with any of the embodiments of a filter system 100, filter cap 200, or insert 300 as described herein. In some cases, the insert or filter cap may be sold, manufactured, bought or otherwise obtained as a replacement part of for other reasons such as the modification of a filter system. In some instances, the insert or filter cap may be sold together as an assembly.

The filter cap and insert may be made using a plastic injection molding process. The filter cap and insert may be molded of any suitable material such as a thermoplastic material that is easily molded and that can provide the end properties needed or desired for any particular application. In some embodiments, the material used may be polycarbonate, high density polyethylene, etc.

It is further contemplated that the filter cap may be made as an assembly of parts instead of a single piece. The indicia on the insert may be molded into the top surface using a replaceable insert in the mold that may be switched out depending on the situation to communicate different aspects of a filter system.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A filter cap assembly comprising:
   a filter cap including
      a body including a hollow cylindrical configuration, defining a radial direction and longitudinal axis, the body further including a cylindrical sidewall, an open end disposed along the axis, and an enclosed end disposed along the axis;
      a domed wall that encloses the filter cap at the enclosed end and includes a hexagonal structure extending outwardly from the domed wall, wherein the hexagonal structure defines a hexagonal outer perimeter, an inner perimeter, and at least a first void disposed between the outer perimeter and the inner perimeter outwardly from the domed wall; and
      a first rib extending inwardly from the domed wall, the first rib being disposed radially between the hexagonal structure and the cylindrical sidewall;
   an insert including
      a cover portion including a top surface, a bottom surface, and a hexagonal perimeter; and
      a first projection that extends from the bottom surface of the cover portion and that is configured to be press fit into the at least first void.

* * * * *